(12) United States Patent
Kakiuchi et al.

(10) Patent No.: US 6,750,165 B2
(45) Date of Patent: Jun. 15, 2004

(54) CLEANING WET SHEET

(75) Inventors: Shusuke Kakiuchi, Tochigi (JP); Taeko Hayase, Tochigi (JP)

(73) Assignee: Kao Corporation, Tokyo (JP)

( * ) Notice: Subject to any disclaimer, the term of this patent is extended or adjusted under 35 U.S.C. 154(b) by 182 days.

(21) Appl. No.: 10/088,649

(22) PCT Filed: Jul. 30, 2001

(86) PCT No.: PCT/JP01/06544
§ 371 (c)(1),
(2), (4) Date: Jun. 5, 2002

(87) PCT Pub. No.: WO02/11600
PCT Pub. Date: Feb. 14, 2002

(65) Prior Publication Data
US 2003/0027473 A1 Feb. 6, 2003

(30) Foreign Application Priority Data
Aug. 4, 2000 (JP) ........................................ 2000-237565
Aug. 4, 2000 (JP) ........................................ 2000-237566

(51) Int. Cl.[7] ................................................. B32B 5/26
(52) U.S. Cl. ........................ 442/319; 442/71; 442/327; 442/414
(58) Field of Search .................... 442/71, 319, 327, 442/381, 414; 15/209.1, 228

(56) References Cited

U.S. PATENT DOCUMENTS 4,603,069 A    7/1986    Haq et al.

FOREIGN PATENT DOCUMENTS

| JP | 2-59761 U | 5/1990 |
| JP | 5-15481 | 1/1993 |
| JP | 5-63453 U | 8/1993 |
| JP | 55-115657 | 8/1993 |
| JP | 10-272082 A | 10/1998 |

Primary Examiner—Elizabeth M. Cole
Assistant Examiner—Arden Sperty
(74) Attorney, Agent, or Firm—Birch, Stewart, Kolasch & Birch, LLP

(57) ABSTRACT

A wet cleaning sheet 1 comprises an aqueous liquid-retaining layer 4 having an aqueous liquid-containing polymer and a chemical-containing layer 2 or 9 containing a chemical which causes the polymer to release the aqueous liquid. The aqueous liquid-retaining layer 4 and the chemical-containing layer 2 or 9 are formed and/or arranged in such a manner that they are kept out of substantial contact under no load applied but brought into contact with each other with a prescribed load applied whereby the aqueous liquid is gradually released from the polymer by the action of the chemical.

10 Claims, 2 Drawing Sheets

CLEANING WET SHEET

This application is the national phase under 35 U.S.C. §371 of PCT International Application No. PCT/JP01/06544 which has an International filing date of Jul. 30, 2001, which designated the United States of America.

TECHNICAL FIELD

The present invention relates to a wet sheet for cleaning which is capable of retaining a large amount of an aqueous liquid and releasing the aqueous liquid gradually so that a wide area of a surface to be cleaned can be wiped therewith.

BACKGROUND ART

JP-A-5-15481 discloses a cleaning sheet with a smooth surface which comprises cleaning cloth impregnated with a solvent-containing cleaner, the cleaning cloth having a dust-removing fiber layer composed of ultrafine fibers or split fibers, etc. and a liquid-absorbing fiber layer. However, with no considerations given to gradual-releasing properties of the impregnated cleaning cloth, the cleaning sheet with a smooth surface releases the cleaner more than necessary onto a surface to be cleaned in a single operation of cleaning, having difficulty in cleaning a wide area. Further, this cleaning sheet with a smooth surface needs cares in storage or handling because the solvent, etc. may evaporate unless it is tightly sealed until use.

Accordingly, an object of the present invention is to provide a wet cleaning sheet that is capable of retaining a large amount of an aqueous liquid and releasing the aqueous liquid evenly and gradually.

Another object of the present invention is to provide a wet cleaning sheet which is easy to store and handle without requiring great care about liquid evaporation.

Still another object of the present invention is to provide a wet cleaning sheet which is capable of cleaning a wide area of a surface to be cleaned without separately using water or a liquid detergent.

Yet another object of the present invention is to provide a wet cleaning sheet which is capable of not only cleaning but polishing (waxing) a floor of a wide area.

DISCLOSURE OF THE INVENTION

The present invention accomplishes the above objects by providing a wet cleaning sheet comprising an aqueous liquid-retaining layer having an aqueous liquid-containing polymer and a chemical-containing layer containing a chemical which causes the polymer to release the aqueous liquid, wherein
the aqueous liquid-retaining layer and the chemical-containing layer are formed and/or arranged in such a manner that they are kept out of substantial contact under no load applied but brought into contact with each other with a prescribed load applied whereby the aqueous liquid is gradually released from the polymer by the action of the chemical.

BEST MODE FOR CARRYING OUT THE INVENTION

Figure 1A:
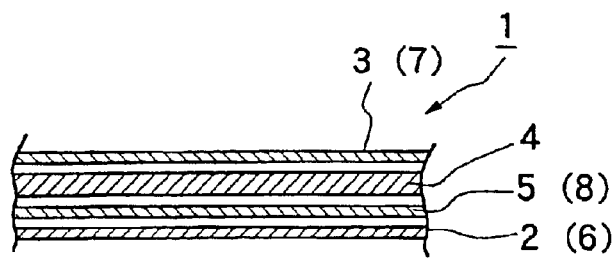
FIG. 1A is a schematic view showing the structure of an embodiment of the wet cleaning sheet according to the present invention.
Figure 1B:
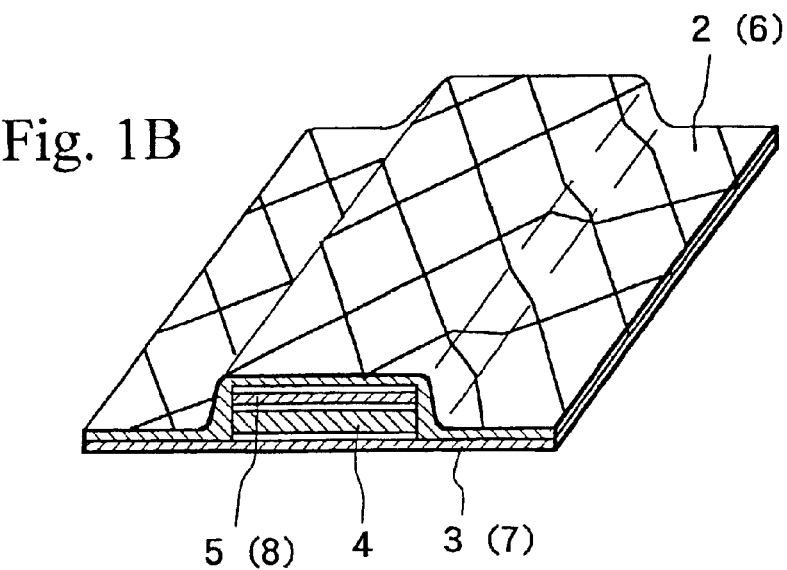
FIG. 1B is a perspective view of the wet cleaning sheet shown in FIG. 1A.

The present invention will be described based on its preferred embodiments by referring to the drawings. FIGS. 1A and 1B schematically illustrate the structure of an embodiment of the wet cleaning sheet according to the present invention. In FIG. 1B, the sheet of FIG. 1A is turned upside down for the sake of convenience.

The wet cleaning sheet 1 (hereinafter simply referred to as a wet sheet) shown in FIGS. 1A and 1B is a wet type sheet retaining an aqueous liquid. It has a first outer layer 2, a second outer layer 3, an aqueous liquid-retaining layer 4 interposed between the first outer layer 2 and the second outer layer 3, and an isolating layer 5 interposed between the aqueous liquid-retaining layer 4 and the first outer layer 2.

The first outer layer 2 is a chemical-containing layer which contains a prescribed chemical and serves as a cleaning side of the wet sheet 1. This layer is made of a supporting sheet 6 which holds the chemical. The supporting sheet 6 is preferably made of a material capable of gradually releasing the aqueous liquid retained in the inside of the wet sheet 1.

The supporting sheet 6 includes a fiber aggregate such as paper, wet-processed or dry-processed nonwoven fabric, woven fabric or knitted fabric, and a film with a large number of openings. It is particularly preferred to use paper or nonwoven fabric for its cleaning performance and from the economical consideration. Where the supporting sheet 6 is a fiber aggregate, it is preferred for the fibers constituting the fiber aggregate to have moderate hydrophilic properties from the standpoint of dust or dirt collecting properties. Such hydrophilic fibers include cellulosic fibers, e.g., wood pulp and cotton, natural fibers such as flax, and cellulosic chemical fibers such as viscous rayon, Tencel, and acetate. Hydrophobic synthetic fibers whose surface has been rendered hydrophilic are also useful.

In using nonwoven fabric made mainly of hydrophilic fibers, which is a kind of fiber aggregate, as a supporting sheet 6, various nonwoven fabrics prepared from one of or a mixture of cellulosic fibers such as cotton, rayon and pulp (including wet-processed nonwoven fabrics and dry-processed fabrics such as thermally bonded nonwoven, chemically bonded nonwoven, needle-punched nonwoven and spunlaced nonwoven) can be used. In using paper made mainly of hydrophilic fibers, which is another kind of fiber aggregate, as a supporting sheet 6, any of wet-processed pulp sheeting prepared from pulp by papermaking processing, wet-processed binder sheeting having enhanced wet strength by applying a binder after papermaking, dry-processed pulp sheeting prepared by adhering disintegrated and accumulated pulp fibers with a binder and shaping into a sheet form, and the like can be used.

Where it is desired for the wet sheet of the present invention to have improved ability to catch up hairs or fluffy dust in cleaning operation, it is preferable to use as a supporting sheet 6 nonwoven fabric which is made of fibers of 20 mm or longer, particularly 30 to 100 mm, especially 35 to 65 mm, entangled to a low degree. Such low-entangled nonwoven fabric includes spunlaced nonwoven, thermally bonded nonwoven such as air-through nonwoven, spun-bonded nonwoven, and raised or piled nonwoven. In this case, not all the fibers constituting the low-entangled nonwoven fabric made of fibers of 20 mm or longer do not need to have a fiber length of 20 mm or longer. It is permitted that the low-entangled nonwoven fabric contains fibers shorter than 20 mm which may have been inevitably incorporated in the raw materials and/or produced during production. It is preferred to give the supporting sheet 6 a large number of bosses by thermal embossing to improve handling properties (to reduce frictional resistance) in a cleaning operation.

In order for the supporting sheet 6 to gradually release an aqueous liquid in an amount adequate for cleaning, it is preferred for the supporting sheet 6 to have a density (bulk density) of 0.01 to 1.0 g/cm$^3$, particularly 0.05 to 0.5 g/cm$^3$, especially 0.1 to 0.3 g/cm$^3$, under a load of 3.0 gf/cm$^2$.

In order for the supporting sheet 6 to secure sufficient strength against a surface to be cleaned in a cleaning operation and to gradually release an aqueous liquid in an amount adequate for cleaning, it is preferred for the supporting sheet 6 to have a basis weight of 5 to 150 g/m$^2$, particularly 10 to 100 g/m$^2$, especially 20 to 70 g/m$^2$.

From assuring both gradual release of the aqueous liquid and finish of the cleaned surface, the amount of the chemical held in the supporting sheet 6 is preferably 1 to 100 g/m$^2$, still preferably 5 to 60 g/m$^2$, while depending on the kind of the chemical and the amount of the polymer (described later) present in the aqueous liquid-retaining layer 4.

The chemical held in the supporting sheet 6 is a substance which causes the polymer, described later, present in the aqueous liquid-retaining layer 4 (the polymer contains an aqueous liquid as described later) to release the aqueous liquid. A proper chemical should be chosen according to the mechanism of action of causing the polymer to release the aqueous liquid. For example, an electrolyte or an acidic or basic substance is used as the chemical. An ionic substance scavenger is also useful as the chemical.

In using an electrolyte as the chemical, the aqueous liquid is released from the polymer by the osmotic pressure equilibrating action, crosslinking action or salting-out action of the electrolyte. For example, where the polymer is crosslinked sodium polyacrylate that is an ionic superabsorbent resin, and the crosslinked polyacrylate is swollen with an aqueous liquid, the electrolyte acts on the crosslinked polyacrylate to make it release the aqueous liquid to decrease the osmotic pressure difference. With some kinds of electrolytes (for example, in using a salt of polyvalent metal ions), carboxyl groups are crosslinked by the polyvalent metal ions to cause gel shrinkage whereby the aqueous liquid is released from the crosslinked polyacrylate. Where the polymer is nonionic methyl cellulose swollen with an aqueous liquid, salting out of the polymer takes place by the action of a large quantity of the electrolyte whereby the aqueous liquid is released.

To achieve satisfactory release of the aqueous liquid from the polymer, it is preferable to use, as an electrolyte, polyvalent metal ion salts, such as monovalent metal ion salts, e.g., sodium chloride, potassium chloride, sodium sulfate, sodium carbonate, potassium carbonate, disodium hydrogenphosphate, dipotassium hydrogenphosphate, and sodium citrate; and divalent metal ion salts, e.g., magnesium sulfate, calcium chloride and zinc sulfate.

On the other hand, where the chemical is an acidic substance or a basic substance, the aqueous liquid is released from the polymer by the deionizing action of the acidic or basic substance. For example, where the polymer is crosslinked sodium polyacrylate that is an ionic superabsorbent resin, and the crosslinked polyacrylate is swollen with an aqueous liquid, deionization of carboxyl groups (ion exchange) occurs by the action of an acidic substance whereby the aqueous liquid is released from the crosslinked polyacrylate.

The acidic substance is preferably one having a pKa value for the first stage of dissociation (25° C.) of 0 to 12, particularly 2 to 5, for causing satisfactory deionization. The basic substance is preferably one having a pKb value (25° C.) of 1 to 10, particularly 1 to 7, more particularly 2 to 7, for the same reason.

Specific examples of the acidic substance include organic acids such as citric acid, malic acid, tartaric acid, and L-ascorbic acid; and inorganic acids such as boric acid, phosphoric acid, and tripolyphosphoric acid. Citric acid, malic acid and L-ascorbic acid are preferred for safety and the like.

Specific examples of the basic substance include organic bases such as monoethanolamine, diethanolamine, triethanolamine, and 2-amino-2-methyl-1-propanol; and inorganic bases such as disodium hydrogenphosphate, sodium borate, sodium carbonate, potassium carbonate, and sodium acetate. In particular disodium hydrogenphosphate, sodium carbonate, 2-amino-2-methyl-1-propanol, and monoethanolamine are preferred for safety and the like.

Where the aqueous liquid-retaining layer 4 hereinafter described comprises an aqueous liquid-containing gel formed by crosslinking a water-soluble polymer with an ionic substance, the ionic substance scavenger to be used is a substance capable of drawing the ionic substance from the aqueous liquid-containing gel. A proper ionic substance scavenger is selected according to the kind of the ionic substance which crosslinks with the water-soluble polymer to form the aqueous liquid-containing gel. For example, where the ionic substance is a cationic substance such as metal ions, chelating agents such as ethylenediaminetetraacetic acid (EDTA) salts, nitrilotriacetic acid (NTA) salts, iminodiacetic acid (IDA) salts, citric acid salts, and tripolyphosphoric acid salts, are used as an ionic substance scavenger. Where the ionic substance is an anionic substance such as borate ions, metal ions such as a magnesium ion and a scandium ion, and other various cations are used. From the sake of safety, etc., EDTA salts and citric acid salts are preferably used.

The chemical can be applied to and held in the supporting sheet 6 by, for example, sprinkling the chemical of powder form, or once dissolving the chemical in water and applying the aqueous solution by spraying, spread coating or dip coating. Whichever method is taken, application is preferably followed by drying to prepare the supporting sheet 6.

The second outer layer 3 provides the side opposite to the cleaning side of the wet sheet 1 and is formed of a sheet (hereinafter referred to as a backside sheet) 7. The backside sheet 7 is a member that is brought into contract with user's hands or a cleaning tool upon use of the wet sheet 1. It is impermeable to liquid. Suitable sheeting for making the backside sheet 7 includes film of thermoplastic resins such as polyolefins, e.g., polyethylene and polypropylene. It is preferred for the backside sheet 7 to have a basis weight of 10 to 100 g/m$^2$, particularly 20 to 50 g/m$^2$, from the economical considerations and for assuring strength upon use and development of sufficient liquid impermeability.

The aqueous liquid-retaining layer 4 is a layer having a polymer containing an aqueous liquid (hereinafter also referred to as an aqueous liquid-containing polymer). The aqueous liquid-retaining layer 4 may be made solely of the aqueous liquid-containing polymer or formed of a prescribed support holding the aqueous liquid-containing polymer. In case where the aqueous liquid-retaining layer 4 is an aqueous liquid-containing polymer held on a support, the support includes fiber aggregates such as nonwoven fabric, woven fabric and knitted fabric, and porous bodies such as sponge.

The amount of the aqueous liquid-containing polymer in the aqueous liquid-retaining layer 4 is desirably 10 to 200 g, more desirably 20 to 100 g, per wet sheet 1 while dependent on the kind, etc. of the constituent polymer. The above amount is preferred for assuring both capability of cleaning a wide area and handling properties in cleaning.

The polymer of the aqueous liquid-containing polymer is preferably one capable of taking up and retaining a large quantity of an aqueous liquid. Such an aqueous liquid-containing polymer includes ionic superabsorbent resins having absorbed an aqueous liquid, low-fluidity ionic polymers which contain an aqueous liquid and have a viscosity of 10,000 mPa·s or higher at 25° C., and low-fluidity nonionic polymers. Ionic superabsorbent resins having absorbed an aqueous liquid and low-fluidity ionic polymers containing an aqueous liquid and having a viscosity of 10,000 mPa·s or higher at 25° C. are particularly preferred for their capability of releasing the aqueous liquid by the action of a small amount of an electrolyte. The viscosity as referred to above is measured with a Brookfield viscometer. The rotor and the number of revolutions are of choice according to the viscosity.

The ionic superabsorbent resins include those of natural origin such as crosslinked products of hydroxyethyl cellulose, starch, carboxymethyl cellulose, alginic acid (and its salts), hyaluronic acid (and its salts), polyglutamic acid (and its salts), chitosan and polylysine; and those chemically synthesized such as anionic crosslinked products of polyacrylic acid (and its salts), poly(isobutylene-maleic acid) (and its salts), poly(2-acrylamido-2-methylpropanesulfonic acid) (and its salts), polyacryloxypropanesulfonic acid (and its salts) and polyvinylphosphonic acid (and its salts), cationic crosslinked products of polymethacryloyloxyethylammonium chloride, polyvinylpyridine and polyethyleneimine, and betaine type crosslinked products of N,N-dimethyl-N-(3-acrylamidopropyl)-N-(carboxymethyl)ammonium salt, etc. Starch-acrylic acid (or its salt) graft copolymers, saponification products of starch-acrylonitrile copolymers, acrylic acid (or its salt) copolymers are also included. Fibrous materials made of these polymers are also useful. Carboxylic acid-based polymers having a crosslinked network structure are particularly preferred.

The low-fluidity ionic polymers include anionic polymers of cellulosic type, starch type, acrylic type or vinyl type, etc. having a carboxylate ion, a sulfonate ion, etc. in their side chains; cationic polymers of cellulosic type, starch type, acrylic type or vinyl type, etc. having an amino group, an ammonium ion, etc. in their side chains; and betaine type polymers. Acrylic acid-based polymers such as sodium polyacrylate and acrylic acid-alkyl methacrylate copolymer sodium salts, or carboxylic acid-based polymers having a crosslinked network structure such as crosslinked acrylic acid-based polymers are particularly preferred for low stickiness or low sliminess.

As mentioned above, the low-fluidity ionic polymers preferably have a viscosity of 10000 mPa·s or higher at 25° C. For further enhancing aqueous liquid retentivity, the viscosity is still preferably 30,000 to 1,000,000 mPa·s, particularly preferably 50,000 to 700,000 mPa·s.

The aqueous liquid-containing polymer is prepared from an aqueous liquid and a polymer as follows. In using, for example, the above-described ionic superabsorbent resin as a polymer, the ionic superabsorbent resin is put into the aqueous liquid, and the mixture is stirred to let the superabsorbent resin absorb the aqueous liquid and become gel. In using the above-described low-fluidity ionic polymer as a polymer, the low-fluidity ionic polymer is put into the aqueous liquid, and the mixture is stirred to let the low-fluidity ionic polymer absorb the aqueous liquid and become gel.

Another preferred example of the aqueous liquid-containing polymer in the aqueous liquid-retaining layer 4 is an aqueous liquid-containing gel which is formed by crosslinking a water-soluble polymer with an ionic substance. The water-soluble polymer is preferably one capable of taking in and retaining a large amount of an aqueous liquid when crosslinked with an ionic substance. Such a water-soluble polymer includes carboxylic acid-based polymers such as acrylic acid polymers, methacrylic acid polymers, carboxymethyl cellulose and carboxyethyl cellulose, polyvinyl alcohol, and natural polysaccharides. Natural polysaccharides are particularly preferred for their ability to gradually release an aqueous liquid in an amount sufficient for cleaning.

The natural polysaccharides include carrageenans, e.g., κ-carrageenan and ι-carrageenan, sodium alginate, gellan gum, xanthan gum, locust bean gum, and guar gum. Carrageenans are particularly preferred for their ability to release an aqueous liquid gradually.

The ionic substance which can be used to crosslink the water-soluble polymers includes cationic substances and anionic substances, selected according to the properties of the water-soluble polymer to be crosslinked. Cationic substances include metal ions such as calcium, potassium, magnesium, strontium, barium, zinc, iron, copper, aluminum, nickel and cobalt ions. Anionic substances include a borate ion which crosslink-bonds to polyvinyl alcohol.

The ionic substance is used in the form of an electrolyte containing the ionic substance. The electrolyte which can be used includes calcium chloride, calcium acetate, potassium chloride, potassium sulfate, potassium carbonate, magnesium chloride, magnesium sulfate, magnesium carbonate, zinc chloride, zinc sulfate, ferrous chloride, ferric chloride, aluminum chloride, aluminum sulfate, boric acid, and sodium tetraborate.

The aqueous liquid-containing gel can be obtained from the ionic substance and the water-soluble polymer as follows. The electrolyte containing the ionic substance is dissolved in water or an aqueous detergent to prepare an aqueous solution, and the resulting aqueous solution and the water-soluble polymer or an aqueous solution of the water-soluble polymer are mixed by stirring, whereby the ionic substance generated by dissociation of the electrolyte crosslinks the water-soluble polymer. As the water-soluble polymer is crosslinked, the water or the aqueous detergent is taken into the water-soluble polymer in a large quantity to form an aqueous liquid-containing gel. Alternatively, the electrolyte containing the ionic substance is dissolved in an aqueous solution of the water-soluble polymer, and an aqueous detergent is then dissolved therein to obtain an aqueous liquid-containing gel.

In the present invention, the preferred combinations of the aqueous liquid-containing polymer and the chemical are as follows. The low-fluidity ionic polymer containing an aqueous liquid and having a viscosity of 10,000 mPa·s or higher at 25° C. or an ionic superabsorbent resin having absorbed an aqueous liquid as an aqueous liquid-containing polymer is preferably combined with an electrolyte or an acidic or basic substance as a chemical. The aqueous liquid-containing gel formed by crosslinking a water-soluble polymer with an ionic substance, used as an aqueous liquid-containing polymer, is preferably combined with an ionic substance scavenger as a chemical.

The aqueous liquid which is retained by the polymer in the present invention includes water and an aqueous detergent. A preferred amount of the aqueous liquid to be retained is 10 to 1000 times, particularly 50 to 500 times, the weight of the polymer in view of a satisfactory feel to the touch and finish.

The aqueous detergent, used as an aqueous liquid, includes formulations comprising water as a medium having added thereto surface active agents, water-soluble solvents, alkalis, acids, polishing agents, waxing agents, antimicrobials, antiseptics, metal salts, perfumes, colorants, and so on. For satisfactory cleaning performance and finish, the water content is preferably 60% by weight or more, still preferably 70 to 95% by weight.

The surface active agents which can be used include anionic, nonionic, cationic and amphoteric surface active agents. Particularly preferred for cleaning performance and finish are nonionic surface active agents such as polyoxyalkylene (mole number of alkylene oxide added: 1 to 20) alkyl (straight-chain or branched; carbon atom number: 8 to 22) ethers, alkyl (straight-chain or branched; carbon atom number: 8 to 22) glycosides (average degree of sugar condensation: 1 to 5), sorbitan fatty acid (straight-chain or branched; carbon atom number: 8 to 22) esters, and alkyl (straight-chain or branched; carbon atom number: 6 to 22) glyceryl ethers; and amphoteric surface active agents such as alkylcarboxybetaines, alkylsulfobetaines, alkylhydroxysulfobetaines, alkylamidocarboxybetaines, alkylamidosulfobetaines, and alkylamidohydroxysulfobetaines (each containing 8 to 24 carbon atoms in the alkyl moiety thereof). For cleaning performance and finish, a preferred content of the surface active agents in the aqueous detergent is 0.01 to 5.0% by weight, particularly 0.05 to 2.0% by weight.

One or more than one of monohydric and polyhydric alcohols and derivatives thereof are suitably used as a water-soluble solvent. Those having a vapor pressure of 2 mmHg or higher are preferred for finish. For example, ethanol, isopropyl alcohol, propanol, ethylene glycol monomethyl ether, and propylene glycol monomethyl ether are preferred. A preferred content of the water-soluble solvent in the aqueous detergent is 1 to 40% by weight, particularly 1 to 20% by weight, from the standpoint of odor and low irritation to the skin.

Preferred alkalis include hydroxides such as sodium hydroxide, carbonates such as sodium carbonate, alkaline sulfates such as sodium hydrogensulfate, phosphates such as sodium primary phosphate, organic alkali metal salts such as sodium acetate and sodium succinate, ammonia, alkanolamines such as mono-, di- or triethanolamine, β-aminoalkanols such as 2-amino-2-methyl-1-propanol, and morpholine. From the aspect of feel and pH buffering properties, alkanolamines such as mono-, di- or triethanolamine, β-aminoalkanols such as 2-amino-2-methyl-1-propanol, and morpholine are preferred. A preferred alkali content is 0.01 to 5% by weight, particularly 0.05 to 1% by weight, in view of cleaning performance and feel.

The isolating layer 5 is provided between the aqueous liquid-retaining layer 4 and the first outer layer 2 so that the aqueous liquid contained in the aqueous liquid-containing polymer may be released gradually to the cleaning surface.

The isolating layer 5 is formed of a liquid-permeable sheet (hereinafter referred to as an isolating sheet 8). The isolating sheet 8 isolates the aqueous liquid-retaining layer 4 from the first outer layer 2, i.e., the chemical-containing layer, until use of the wet sheet 1. On use of the wet sheet 1, it allows a gradual contact between the chemical present in the first outer layer 2 that is the chemical-containing layer and the aqueous liquid-containing polymer present in the aqueous liquid-retaining layer 4 to release the aqueous liquid (water or an aqueous detergent) from the aqueous liquid-containing polymer.

The isolating sheet 8 can be of the same material as used as the above-described supporting sheet 6. It is preferred for the isolating sheet 8 to have a basis weight of 5 to 200 g/m$^2$, particularly 20 to 100 g/m$^2$, so as to secure sufficient isolation of the aqueous liquid-retaining layer 4 from the first outer layer 2 and to control the rate of contact between the chemical present in the first outer layer 2 and the aqueous liquid-containing polymer present in the aqueous liquid-retaining layer 4. For the same purpose, the thickness of the isolating sheet 8 is preferably 0.1 to 10 mm, particularly 0.2 to 5 mm.

In order to make the aqueous liquid-retaining layer 4 release the aqueous liquid in equal portions so that a wide area may be cleaned, the isolation by the isolating sheet 8 is preferably such that the chemical present in the first outer layer 2 and the aqueous liquid-containing polymer present in the aqueous liquid-retaining layer 4 are prevented from being brought into contact with each other until a load of 100 to 400 Pa, particularly 200 to 2000 Pa, is applied.

As shown in FIG. 1B, the first outer layer 2, the second outer layer 3, the aqueous liquid-retaining layer 4, and the isolating layer 5 have substantially the same width. The aqueous liquid-retaining layer 4 and the isolating layer 5 have substantially the same length. The first outer layer 2 and the second outer layer 3 extend from both the front and the rear edges of the aqueous liquid-retaining layer 4 and the isolating layer 5, and these two layers (the first outer layer 2 and the second outer layer 3) are fixed together by a prescribed bonding means in these extensions. The bonding means include press bonding, fusion bonding, bonding with an adhesive, and arbitrary combinations thereof.

Since the aqueous liquid-containing polymer in the aqueous liquid-retaining layer 4 is capable of retaining a large amount of an aqueous liquid (water or an aqueous detergent), the wet sheet 1 of the embodiment having the above-described constitution has an extremely high capacity of aqueous liquid retention.

In the wet sheet 1 of the present embodiment, the first outer layer 2 which is a chemical-containing layer and the aqueous liquid-retaining layer 4 are isolated by the isolating sheet 8 under no load applied before use. That is, the chemical present in the first outer layer 2 and the aqueous liquid-containing polymer in the aqueous liquid-retaining layer 4 are kept out of substantial contact. The language "kept out of substantial contact" is intended to mean not only that there is no contact between the chemical and the aqueous liquid-containing polymer but that a state in which they are inevitably brought into contact with each other to release a trace amount of the aqueous liquid is permissible. With a prescribed load applied to the wet sheet 1 while in use, on the other hand, the chemical in the first outer layer 2 and the aqueous liquid-containing polymer in the aqueous liquid-retaining layer 4 are brought into contact with each other. Upon this contact, the aqueous liquid is released from the aqueous liquid-containing polymer by the action of the chemical. Where, in particular, the aqueous liquid-containing polymer is an aqueous liquid-containing gel formed by crosslinking a water-soluble polymer with an ionic substance, and the chemical is an ionic substance scavenger, the contact results in formation of a complex between the ionic substance scavenger and the ionic substance. It follows that the crosslinked structure of the water-soluble polymer is destroyed to release the aqueous liquid that has been held therein. The released aqueous liquid passes through the isolating sheet 8 and the supporting sheet 6, both having water permeability, and is applied to a surface to be cleaned. As described previously, the released aqueous liquid is water or an aqueous detergent and contains various components that have been added in the preparation of the aqueous liquid-containing polymer.

Since the contact between the chemical and the aqueous liquid-containing polymer under a prescribed applied load is indirect via the isolating sheet 8, the release of the aqueous liquid from the aqueous liquid-containing polymer caused by the contact is gradual. In other words, a large quantity of the aqueous liquid that is retained in the aqueous liquid-containing polymer is gradually released so that a surface with a wide area can be cleaned. Because separate application of water or a detergent is not needed in cleaning, cleaning can be carried out very conveniently. Because the wet cleaning sheet 1 does not have the aqueous liquid oozed on its surface before use, it does not need great care about evaporation loss of the aqueous liquid and the like and is easy to store and handle.

Thus, the wet sheet 1 according to the present embodiment releases an aqueous liquid by itself and is suited for cleaning various hard surfaces such as floors made of wood, vinyl resins (cushioning flooring), tiles, etc., walls, ceilings, furniture, bath tubs, basins, etc. Since the aqueous liquid is released slowly in small portions, it is easy with the wet sheet 1 to clean tatami (flooring made of grass) and the like that had to be wiped with floor cloth dipped in an aqueous liquid and wrung dry.

The wet sheet 1 of the present embodiment is used to wipe with a hand or as attached to a prescribed cleaning tool, for example, a cleaning tool having a flat head with a flat base and a stick handle connected to the head via a universal joint. It is easy to clean a surface of a wide area, for example, wooden floors with the wet sheet 1 attached to this cleaning tool with its outer layer 3 in contact with the flat base of the head. Made of a liquid-impermeable material, the second outer layer 3, one of the exterior sides of the wet sheet 1, to which a hand is applied, does not wet the hand. Similarly, the cleaning tool, to which the second outer layer 3 is brought into contact, is not wetted with the aqueous liquid.

Figure 2A:
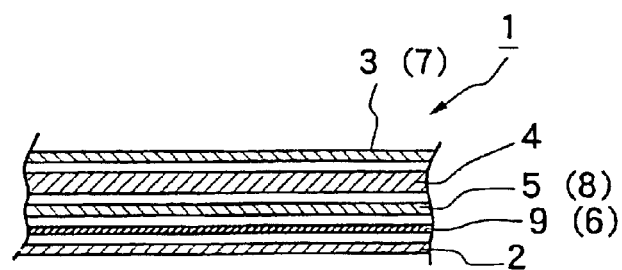
FIGS. 2A and 2B each are a schematic view showing the structure of another embodiment of the wet cleaning sheet according to the present invention.
Figure 2B:
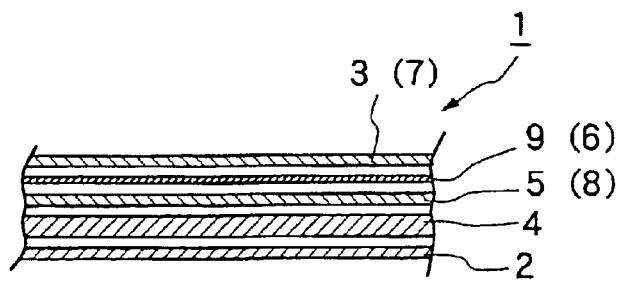

The present invention is not limited to the above-described embodiment. For example, while the first outer layer 2 serves as a chemical-containing layer in the above embodiment, the structures shown in FIGS. 2A and 2B can be taken in place thereof. That is, the first outer layer 2 is made of liquid-permeable sheeting such as hydrophilic nonwoven fabric, and the chemical is separately held in a supporting sheet 6 to make a chemical-containing layer 9. The chemical-containing layer 9 is disposed between the first outer layer 2 and the aqueous liquid-retaining layer 4 as shown in FIG. 2A or between the second outer layer 3 and the aqueous liquid-retaining layer 4 as shown in FIG. 2B. In these cases, it is preferred that an isolating layer 5 formed of an isolating sheet 8 be interposed between the chemical-containing layer 9 and the aqueous liquid-retaining layer 4 as shown in FIGS. 2A and 2B.

The embodiments shown in FIGS. 1, 2A, and 2B may be modified in such a manner that the isolating sheet 8 is a liquid impermeable sheet so that the chemical-containing layer 2 or 9 and the aqueous layer-retaining layer 4 are isolated from each other by the isolating sheet 8 until use, and the isolating sheet 8 is pulled out on use to bring the chemical-containing layer 9 and the aqueous layer-retaining layer 4 into contact with each other.

While in the above embodiment the second outer layer 3 is a liquid impermeable sheet, it is also a preferred embodiment that the second outer layer 3 be made of the same sheet as the first outer layer 2 so that both sides of the wet sheet 1 are serviceable for cleaning.

While, in the above embodiment, the detergent components such as surface active agents are held in the aqueous liquid-containing polymer, they may be held in the isolating sheet 8 or the supporting sheet 6.

While, in the above embodiment, the chemical and the aqueous liquid-containing polymer are isolated by the isolating layer 5, this mode of isolation may be replaced by encapsulating the chemical in microcapsules that rupture under a certain load applied.

EXAMPLES

In Examples hereinafter given, all the percents are by weight unless otherwise noted.

Examples 1 to 5

(1) Preparation of Aqueous Liquid-Containing Polymer

Carbopol Ultrez 10 (produced by BF Goodrich Co.), which is a low-fluidity acrylic acid-based polymer, was dispersed in water, and an alkyl glucoside, ethanol, and 2-amino-2-methyl-1-propanol were added thereto at a ratio described below to prepare an aqueous liquid-containing polymer gel. The viscosity of the prepared aqueous liquid-containing polymer was 180,000 mPa·s (25° C.) as measured with a Brookfield viscometer.

Composition of aqueous liquid-containing polymer: water/Carbopol Ultrez 10/alkyl glucoside/ethanol/2-amino-2-methyl-1-propanol=92.2/0.8/0.1/6.0/0.9.

(2) Preparation of First and Second Outer Layers

A fiber web having a basis weight of 40 g/m$^2$ was prepared from a 50/25/25 mixture (by weight) of rayon fiber (1.7 dtex×40 mm), acrylic fiber (0.9 dtex×51 mm), and core/sheath fiber (1.0 dtex×38 mm) having a polypropylene core and a polyethylene sheath by carding in a conventional manner. The fiber web was subjected to water needling under a low energy condition to prepare spunlaced nonwoven fabric. The spunlaced nonwoven fabric was heat embossed (heat roll temperature: 130° C.) to make a lattice pattern. A 8.7% aqueous sodium chloride solution (11.5 g) was sprayed on both sides of the resulting nonwoven fabric (22 cm by 28 cm; bulk density: 0.15 g/cm$^3$ under 3.0 gf/cm$^2$ load) and dried to prepare a sodium chloride-containing sheet (sodium chloride content: 0.0016 g/cm$^2$) as a first outer layer (chemical-containing layer). A liquid impermeable polyethylene film (22 cm by 28 cm) having a basis weight of 40 g/m$^2$ was prepared as a second outer layer.

In a similar manner, a magnesium sulfate-containing sheet (Example 2; magnesium sulfate content: 0.0018 g/cm$^2$), a calcium chloride-containing sheet (Example 3; calcium chloride content: 0.0016 g/cm$^2$), a zinc sulfate-containing sheet (Example 4; zinc sulfate content: 0.0016 g/cm$^2$), and a citric acid-containing sheet (Example 5; citric acid content: 0.0016 g/cm$^2$) were prepared as a first outer layer (chemical-containing layer).

(3) Preparation of Isolating Layer

A fiber web having a basis weight of 40 g/m$^2$ was prepared from a 70/30 (by weight) mixture of low-melting, crimped core/sheath fiber having a polyester core and a polyethylene sheath (6.6 dtex×51 mm; melting point of sheath: 110° C.) and rayon fiber (5.5 dtex×51 mm) by carding in a conventional manner. The fiber web was dried at 130° C. to prepare air-through nonwoven fabric (basis weight: 40 g/m$^2$) as an isolating layer.

(4) Preparation of Wet Sheet

The isolating layer (10 cm by 28 cm) was put in the middle of the first outer layer (22 cm by 28 cm) which was a chemical-containing layer. The aqueous liquid-containing polymer was applied to the isolating layer to form an aqueous liquid-retaining layer having the same contour as the isolating layer. The spread of the aqueous liquid-containing polymer was 40 g. The second outer layer was superposed on the aqueous liquid-retaining layer. The first and second outer layers which extended from the edges of the isolating layer and the aqueous liquid-retaining layer were heat sealed to prepare a wet sheet having the structure shown in FIGS. 1A and 1B.

Example 6

(1) Preparation of Aqueous Liquid-containing Polymer

To an ionic superabsorbent resin Aquakeep 10SH (produced by Sumitomo Seika Chemicals Co., Ltd.) which is crosslinked sodium polyacrylate was added 150 times the weight (of the resin) of water to prepare an aqueous liquid-containing polymer.

(2) Preparation of Chemical-containing Layer

A 10 cm by 28 cm piece was cut out of the nonwoven fabric used in Example 1 as a first outer layer. A 0.435% aqueous calcium chloride solution (5.2 g) was sprayed onto the entire surface of one side of the piece and dried to prepare a calcium chloride-containing sheet (calcium chloride content: 8.1×10$^{-5}$ g/cm$^2$) as a chemical-containing layer.

(3) Preparation of First Outer Layer

Spunlaced nonwoven fabric having a basis weight of 70 g/m$^2$ was prepared from the same fiber composition as used for the first outer layer of Example 1 by water needling under a low energy condition.

(4) Preparation of Wet Sheet

The aqueous liquid-containing polymer was applied to the middle portion of the first outer layer (22 cm by 28 cm) to form an aqueous liquid-retaining layer having the same contour as the chemical-containing layer (10 cm by 28 cm). The spread of the aqueous liquid-containing polymer was 40 g. The chemical-containing layer was superposed on the aqueous liquid-retaining layer with its non-sprayed side facing the aqueous liquid-retaining layer, and the same second outer layer as used in Example 1 was further superposed thereon. The first and the second outer layers that extended from the edges of the chemical-containing layer and the aqueous liquid-retaining layer were heat sealed to prepare a wet sheet having the structure shown in FIG. 2B but having no isolating layer 5.

Example 7

A 10 cm by 28 cm piece was cut out of the nonwoven fabric used as a first outer layer in Example 1. A 0.87% citric acid aqueous solution (5.2 g) was sprayed to the entire surface of the piece and dried to prepare a citric acid-containing sheet (citric acid content: 1.6×10$^{-4}$ g/cm$^2$) as a chemical-containing layer. A wet sheet was prepared in the same manner as in Example 6, except for using the resulting chemical-containing layer.

Comparative Examples 1 and 2

A wet sheet was prepared in the same manner as in Example 1 or Example 6, except that the first outer layer did not contain sodium chloride (Comparative Example 1) or calcium chloride (Comparative Example 2).

Evaluation of Performance

The wet sheets obtained in Examples 1 to 7 and Comparative Examples 1 and 2 were evaluated in terms of average release of the aqueous liquid, aqueous liquid releasing properties, and aqueous liquid gradual releasing properties in accordance with the following methods. The results obtained are shown in Table 1.

1) Average Aqueous Liquid Release and Releasing Properties

A wooden floor having a size corresponding to ten tatami mats (a tatami mat has a size of 90 cm by 180 cm) was continuously wiped with the wet sheet obtained in Examples and Comparative Examples attached to a cleaning tool Quickle Wiper, available from by Kao Corp. In what follows, the term "tatami" is used to represent a unit area of 90 cm by 180 cm. The amount of the aqueous liquid released per tatami was measured. The amount of the aqueous liquid released per tatami was calculated by measuring the weight of the wet sheet removed from the cleaning head of the tool after cleaning every tatami. One-tatami size of the floor was cleaned by giving 2 double strokes (each stroke being about 90 cm) connected in series to cover a 180 cm length in total in 4 parallel rows to cover a 90 cm width in total. Thereafter, an average amount of the aqueous liquid released per tatami was calculated. The aqueous liquid releasing properties were graded based on the results according to the following standard.

A . . . The amount of the aqueous liquid released per tatami is 0.5 g or more in cleaning a 10-tatami area.

B . . . The amount of the aqueous liquid released per tatami is 0.5 g or more in cleaning an 8-tatami area.

B–C . . . The amount of the aqueous liquid released per tatami is 0.5 g or more in cleaning a 6-tatami area.

C . . . The amount of the aqueous liquid released per tatami is 0.5 g or more in cleaning a 4-tatami area.

D . . . The amount of the aqueous liquid released per tatami is less than 0.5 g in cleaning a 4-tatami area.

2) Aqueous Liquid Gradual Releasing Properties

Slow releasing properties was rated based on the average amount of the released aqueous liquid according to the following standard.

A . . . The amount of the aqueous liquid released per tatami falls within ±50% of the average in cleaning a 10-tatami area.

B . . . The amount of the aqueous liquid released per tatami falls within ±50% of the average in cleaning an 8-tatami area.

B–C . . . The amount of the aqueous liquid released per tatami falls within ±50% of the average in cleaning a 6-tatami area.

C . . . The amount of the aqueous liquid released per tatami falls within ±50% of the average in cleaning a 4-tatami area.

D . . . The amount of the aqueous liquid released per tatami does not fall within ±50% of the average in cleaning a 4-tatami area.

TABLE 1

|  | Ex. 1 | Ex. 2 | Ex. 3 | Ex. 4 | Ex. 5 | Ex. 6 | Ex. 7 | Comp. Ex. 1 | Comp. Ex. 2 |
|---|---|---|---|---|---|---|---|---|---|
| Polymer (g/sheet) | Ultrez 10 (0.32) | Ultrez 10 (0.32) | Ultrez 10 (0.32) | Ultrez 10 (0.32) | Ultrez 10 (0.32) | Aquakeep 10 SH (0.27) | Aquakeep 10 SH (0.27) | Ultrez 10 (0.32) | Aquakeep 10 SH (0.27) |
| Viscosity (mPa · s) | 180,000 | 180,000 | 180,000 | 180,000 | 180,000 | unmeasurable | unmeasurable | 180,000 | unmeasurable |
| Chemical (g/sheet) | NaCl (1.0) | $MgSO_4$ (1.1) | $CaCl_2$ (1.0) | $ZnSO_4$ (1.0) | citric acid (1.0) | $CaCl_2$ (0.0023) | citric acid (0.045) | none | none |
| Aqueous liquid-contg. polymer (g/sheet) | 40 | 40 | 40 | 40 | 40 | 40 | 40 | 40 | 40 |
| Release (g) of aqueous solution |  |  |  |  |  |  |  |  |  |
| 1-tatami | 1.31 | 1.34 | 1.7 | 1.38 | 1.05 | 0.65 | 0.9 | 0.14 | 0.02 |
| 2-tatami | 1.1 | 1.74 | 1.58 | 2.07 | 1.41 | 0.7 | 0.9 | 0.12 | 0.03 |
| 3-tatami | 1.22 | 1.48 | 1.98 | 2.12 | 1.60 | 0.57 | 0.76 | 0.08 | 0.05 |
| 4-tatami | 1.14 | 1.55 | 1.7 | 1.93 | 1.46 | 0.62 | 0.66 | 0.1 | 0.03 |
| 5-tatami | 0.98 | 1.69 | 1.39 | 1.47 | 1.52 | 0.37 | 0.66 | 0.09 | 0.02 |
| 6-tatami | 1.06 | 1.65 | 1.64 | 1.61 | 1.39 | 0.35 | 0.61 | 0.08 | 0.05 |
| 7-tatami | 1.16 | 1.58 | 1.48 | 1.52 | 1.52 | 0.27 | 0.61 | 0.08 | 0.04 |
| 8-tatami | 0.98 | 1.58 | 1.52 | 1.32 | 1.45 | 0.31 | 0.53 | 0.08 | 0.03 |
| 9-tatami | 0.84 | 1.42 | 1.53 | 1.47 | 1.14 | 0.26 | 0.53 | 0.08 | 0.05 |
| 10-tatami | 0.66 | 1.35 | 1.48 | 1.27 | 0.94 | 0.28 | 0.51 | 0.09 | 0.05 |
| Total release | 10.45 | 15.38 | 16 | 16.16 | 13.48 | 4.38 | 6.67 | 0.94 | 0.37 |
| Average release (g) |  |  |  |  |  |  |  |  |  |
| up to 10-tatami | 1.05 | 1.54 | 1.60 | 1.62 | 1.35 | 0.44 | 0.67 | 0.09 | 0.04 |
| up to 8-tatami | 1.12 | 1.58 | 1.62 | 1.68 | 1.43 | 0.48 | 0.70 | 0.10 | 0.03 |
| up to 6-tatami | 1.14 | 1.58 | 1.67 | 1.76 | 1.41 | 0.54 | 0.75 | 0.10 | 0.03 |
| up to 4-tatami | 1.19 | 1.53 | 1.74 | 1.88 | 1.38 | 0.64 | 0.81 | 0.11 | 0.03 |
| Aqueous liquid releasing properties | A | A | A | A | A | C | A | D | D |
| Aqueous liquid gradual releasing properties | A | A | A | A | A | B | A | A | A |

As is apparent from the results in Table 1, the wet sheets of Examples (samples of the present invention) keep releasing the aqueous liquid at or above a certain rate in a gradual manner so that a surface with a wide area can be cleaned. While not shown in the table, the isolating layer in each Example provided such isolation that the chemical, e.g., sodium chloride, and the aqueous liquid-containing polymer did not come into contact until a load of about 500 Pa was applied.

Examples 8 to 10

(1) Preparation of Aqueous Liquid-Containing Gel (Aqueous Liquid-containing Polymer)

To an aqueous solution containing 1% κ-carrageenan that is a water-soluble polymer was added calcium chloride in a concentration of 0.1%. The temperature was raised up to 80° C., at which the mixture was stirred to dissolve. To the resulting solution was added a 40% aqueous solution of dodecyl glucoside (degree of condensation: 1.4) that had been heated to 70° C. beforehand to a concentration of 0.1%. After thoroughly stirring, the mixture was allowed to cool to room temperature to prepare an aqueous liquid-containing gel having the following composition.

Composition of aqueous liquid-containing gel: water/ dodecyl glucoside/κ-carrageenan/calcium chloride= 98.8/0.1/1/0.1

In Example 9, an aqueous liquid-containing gel having the following composition was prepared in the same manner as described above but using ι-carrageenan and calcium chloride.

Composition of aqueous liquid-containing gel: water/ dodecyl glucoside/ι-carrageenan/calcium chloride= 98.8/0.1/1/0.1

In Example 10, dodecyl glucoside was added to an aqueous solution of sodium alginate that is a water-soluble polymer to prepare an aqueous solution with a sodium alginate concentration of 2%. To 1 kg of the aqueous solution was added 500 ml of a 0.25% suspension of calcium secondary phosphate, and 500 ml of a 2.5% citric acid aqueous solution immediately after preparation was then added thereto, followed by stirring thoroughly for 1 minute. The system was allowed to stand to prepare an aqueous liquid-containing gel having the following composition.

Composition of aqueous liquid-containing gel: water/ dodecyl glucoside/sodium alginate/calcium secondary phosphate/citric acid=97.525/0.1/1/0.125/1.25

(2) Preparation of First and Second Outer Layers

A fiber web having a basis weight of 40 g/m² was prepared from a 50/25/25 mixture (by weight) of rayon fiber (1.7 dtex×40 mm), acrylic fiber (0.9 dtex×51 mm), and core/sheath fiber (1.0 dtex×38 mm) having a polypropylene core and a polyethylene sheath by carding in a conventional manner. The fiber web was subjected to water needling under a low energy condition to prepare spunlaced nonwoven fabric. The spunlaced nonwoven fabric was heat embossed (heat roll temperature: 130° C.) to make a lattice pattern. A 10% aqueous solution (20 g) of ethylenediaminetetraacetic acid which is an ionic substance scavenger was sprayed onto the entire surface of the resulting nonwoven fabric (22 cm by 28 cm; bulk density: 0.15 g/cm³ under 3.0 gf/cm² load) and dried to prepare an ionic substance scavenger-containing sheet (ethylenediaminetetraacetic acid content: 0.0032 g/cm²) as a first outer layer. A liquid impermeable polyethylene film (22 cm by 28 cm) having a basis weight of 40 g/m² was prepared as a second outer layer.

(3) Preparation of Isolating Layer

The same air-through nonwoven fabric as used in Example 1 (basis weight: 40 g/m²) was prepared in the same manner as in Example 1, which was used as an isolating layer.

(4) Preparation of Wet Sheet

A wet sheet having the structure shown in FIGS. 1A and 1B was prepared in the same manner as in Example 1. The spread of the aqueous liquid-containing gel was 40 g.

Comparative Example 3

A wet sheet was prepared in the same manner as in Example 9, except that calcium chloride was not added so as not to cause ι-carrageenan to gel.

Composition of aqueous liquid: water/dodecyl glucoside/ι-carrageenan=98.9/0.1/1

Comparative Example 4

A wet sheet was prepared in the same manner as in Example 9, except that ethylenediaminetetraacetic acid (ionic substance scavenger) was not added to the first outer layer.

Comparative Example 5

A wet sheet was prepared in the same manner as in Example 8, except that none of the water-soluble polymer, the electrolyte and the ionic substance scavenger was used and that 20 g of an aqueous liquid having the following composition was applied to the isolating layer.

Composition of aqueous liquid: water/dodecyl glucoside= 99.9/0.1

Evaluation of Performance

The wet sheets obtained in Examples 8 to 10 and Comparative Examples 3 to 5 were evaluated in terms of average release of an aqueous liquid, aqueous liquid releasing properties, and aqueous liquid gradual releasing properties in the same manner as in Example 1. The results obtained are shown in Table 2.

As is apparent from the results in Table 2, the wet sheets of Examples (samples of the present invention) keep releasing the aqueous liquid at or above a certain rate in a gradual manner so that a surface with a wide area can be cleaned. While not shown in the table, the isolating layer in each Example provided such isolation that the ionic substance scavenger and the aqueous liquid-containing gel did not come into contact until a load of about 500 Pa was applied.

The wet cleaning sheet of the present invention is capable of retaining a large quantity of an aqueous liquid and releasing the aqueous liquid evenly and gradually.

The wet cleaning sheet of the present invention achieves cleaning of a surface of a wide area without separately using water or a detergent.

Because the wet cleaning sheet of the present invention does not have the aqueous liquid oozed on its surface before use, it does not need great care about evaporation loss of the aqueous liquid and the like and is easy to store and handle.

What is claimed is:

1. A wet cleaning sheet comprising an aqueous liquid-retaining layer having an aqueous liquid-containing polymer and a chemical-containing layer containing a chemical which causes said polymer to release said aqueous liquid, wherein
    said aqueous liquid-retaining layer and said chemical-containing layer are formed and/or arranged in such a manner that they are kept out of substantial contact under no load applied but brought into contact with each other with a prescribed load applied whereby said aqueous liquid is gradually released from said polymer by the action of said chemical.

2. The wet cleaning sheet according to claim 1, wherein said aqueous liquid-containing polymer comprises a low-fluidity ionic polymer containing an aqueous liquid and having a viscosity of 10,000 mPa·s or higher at 25° C. or

TABLE 2

|  | Example 8 | Example 9 | Example 10 | Comp. Example 3 | Comp. Example 4 | Comp. Example 5 |
| --- | --- | --- | --- | --- | --- | --- |
| Polymer (g/sheet) | κ-carrageenan (0.4) | ι-carrageenan (0.4) | sodium alginate (0.4) | ι-carrageenan (0.4) | ι-carrageenan (0.4) | none |
| Electrolyte (ionic substance) (g/sheet) | calcium chloride (0.4) | calcium chloride (0.4) | calcium chloride (0.4) | none | calcium chloride (0.4) | none |
| Ionic substance scavenger (g/sheet) | EDTA-4Na (1) | EDTA-4Na (1) | EDTA-4Na (1) | EDTA-4Na (1) | none | none |
| Aqueous liquid-containing gel (g/sheet) | 40 | 40 | 40 | 40 | 40 | 20 |
| Release (g) of aqueous solution |  |  |  |  |  |  |
| 1-tatami | 2.02 | 2.15 | 2.70 | 10.25 | 0.06 | 5.68 |
| 2-tatami | 1.65 | 3.56 | 2.03 | 5.68 | 0.08 | 2.47 |
| 3-tatami | 1.51 | 3.18 | 1.73 | 2.38 | 0.07 | 1.52 |
| 4-tatami | 1.28 | 3.39 | 1.33 | 1.34 | 0.08 | 0.98 |
| 5-tatami | 1.16 | 2.70 | 1.00 | 0.97 | 0.07 | 0.85 |
| 6-tatami | 1.27 | 2.03 | 0.79 | 0.78 | 0.07 | 0.64 |
| 7-tatami | 1.11 | 1.47 | 0.71 | 0.55 | 0.05 | 0.52 |
| 8-tatami | 1.00 | 1.28 | 0.65 | 0.45 | 0.04 | 0.54 |
| 9-tatami | 0.98 | 1.07 | 0.62 | 0.38 | 0.04 | 0.48 |
| 10-tatami | 0.78 | 0.85 | 0.50 | 0.37 | 0.05 | 0.42 |
| Total release | 12.76 | 21.68 | 12.06 | 23.15 | 0.61 | 14.28 |
| Average release (g) |  |  |  |  |  |  |
| up to 10-tatami | 1.28 | 2.17 | 1.21 | 2.32 | 0.06 | 1.43 |
| up to 8-tatami | 1.38 | 2.47 | 1.37 | 2.80 | 0.07 | 1.67 |
| up to 6-tatami | 1.48 | 2.84 | 1.60 | 3.57 | 0.07 | 2.05 |
| up to 4-tatami | 1.62 | 3.07 | 1.95 | 4.91 | 0.07 | 2.71 |
| Aqueous liquid releasing properties | A | A | A | B–C | D | B |
| Aqueous liquid gradual releasing properties | B | B | C | D | A | D | comprises an ionic superabsorbent resin having absorbed an aqueous liquid.

3. The wet cleaning sheet according to claim 1, wherein said chemical comprises an electrolyte or an acidic or basic substance, and said aqueous liquid is gradually released from said polymer by the osmotic pressure equilibrating action or crosslinking action of said electrolyte, or said aqueous liquid is gradually released from said polymer by the deionizing action of said acidic or basic substance.

4. The wet cleaning sheet according to claim 1, wherein a liquid-permeable isolating layer is interposed between said aqueous liquid-retaining layer and said chemical-containing layer.

5. The wet cleaning sheet according to claim 1, wherein said chemical-containing layer comprises a supporting sheet and said chemical held in said supporting sheet, said chemical-containing layer serves as one outer side of said wet cleaning sheet, the other side of said wet cleaning sheet comprises a liquid-impermeable backside sheet, and said aqueous liquid-retaining layer is interposed between said chemical-containing layer and said backside sheet.

6. The wet cleaning sheet according to claim 1, wherein said low-fluidity ionic polymer or said ionic superabsorbent resin comprises a carboxylic acid-based polymer having a crosslinked network structure.

7. The wet cleaning sheet according to claim 3, wherein said electrolyte comprises a salt of a monovalent or divalent metal ion, said acidic substance has a pKa value for the first stage of dissociation (25° C.) of 0 to 12, and said basic substance has a pKb value (25° C.) of 1 to 10.

8. The wet cleaning sheet according to claim 1, wherein said aqueous liquid-containing polymer comprises an aqueous liquid-containing gel formed by crosslinking a water-soluble polymer with an ionic substance, said chemical comprises an ionic substance scavenger, and upon contact between said aqueous liquid-containing gel and said ionic substance scavenger, said ionic substance scavenger draws out said ionic substance from said aqueous liquid-containing gel to make the aqueous liquid present in said aqueous liquid-containing gel be released.

9. The wet cleaning sheet according to claim 8, wherein said water-soluble polymer comprises a carboxylic acid-based polymer, polyvinyl alcohol or a natural polysaccharide, and said ionic substance comprises a metal ion or a borate ion.

10. The wet cleaning sheet according to claim 9, wherein said natural polysaccharide is a carrageenan or alginic acid.

* * * * *